United States Patent [19]
Stafford

[11] 3,752,509
[45] Aug. 14, 1973

[54] METAL-TO-METAL TUBE SEAL
[75] Inventor: Warren J. Stafford, Peoria, Ill.
[73] Assignee: Caterpillar Tractor Co., Peoria, Ill.
[22] Filed: Dec. 20, 1971
[21] Appl. No.: 209,944

[52] U.S. Cl............. 285/334.4, 285/368, 285/414, 285/DIG. 18
[51] Int. Cl............................................ F16l 17/00
[58] Field of Search................ 285/334.4, 368, 412, 285/414, DIG. 18

[56] References Cited
UNITED STATES PATENTS

| | | |
|---|---|---|
| 962,075 | 6/1910 | Cash et al.................... 285/334.4 X |
| 796,644 | 8/1905 | Hayden...................... 285/334.4 X |
| 1,662,954 | 3/1928 | Broido........................... 285/368 X |
| 2,767,564 | 10/1956 | Green........................ 285/334.4 X |

Primary Examiner—Dave W. Arola
Attorney—Paul S. Lempio

[57] ABSTRACT

Two axially aligned tubes have clamped, annular sealing members mounted thereon to define convex and spherical surfaces maintained in line sealing contact.

14 Claims, 3 Drawing Figures

PATENTED AUG 14 1973 3,752,509
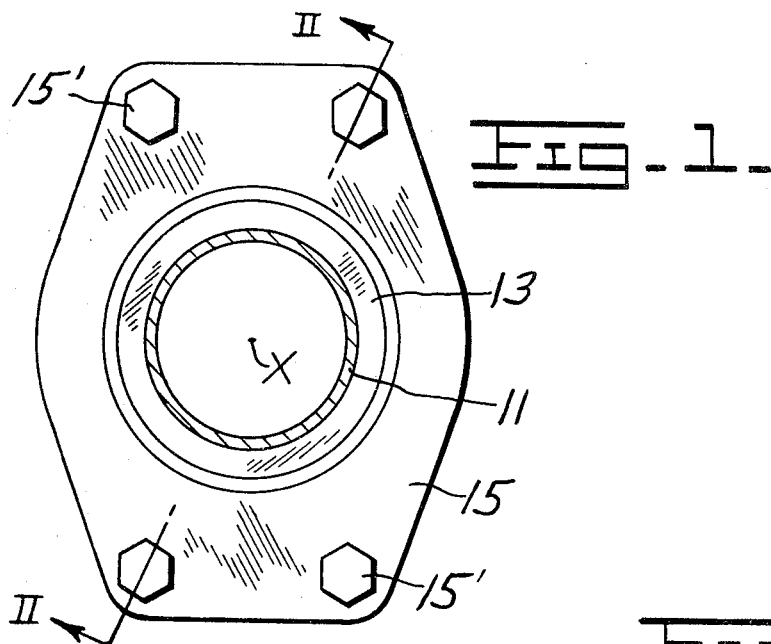
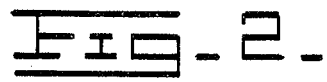
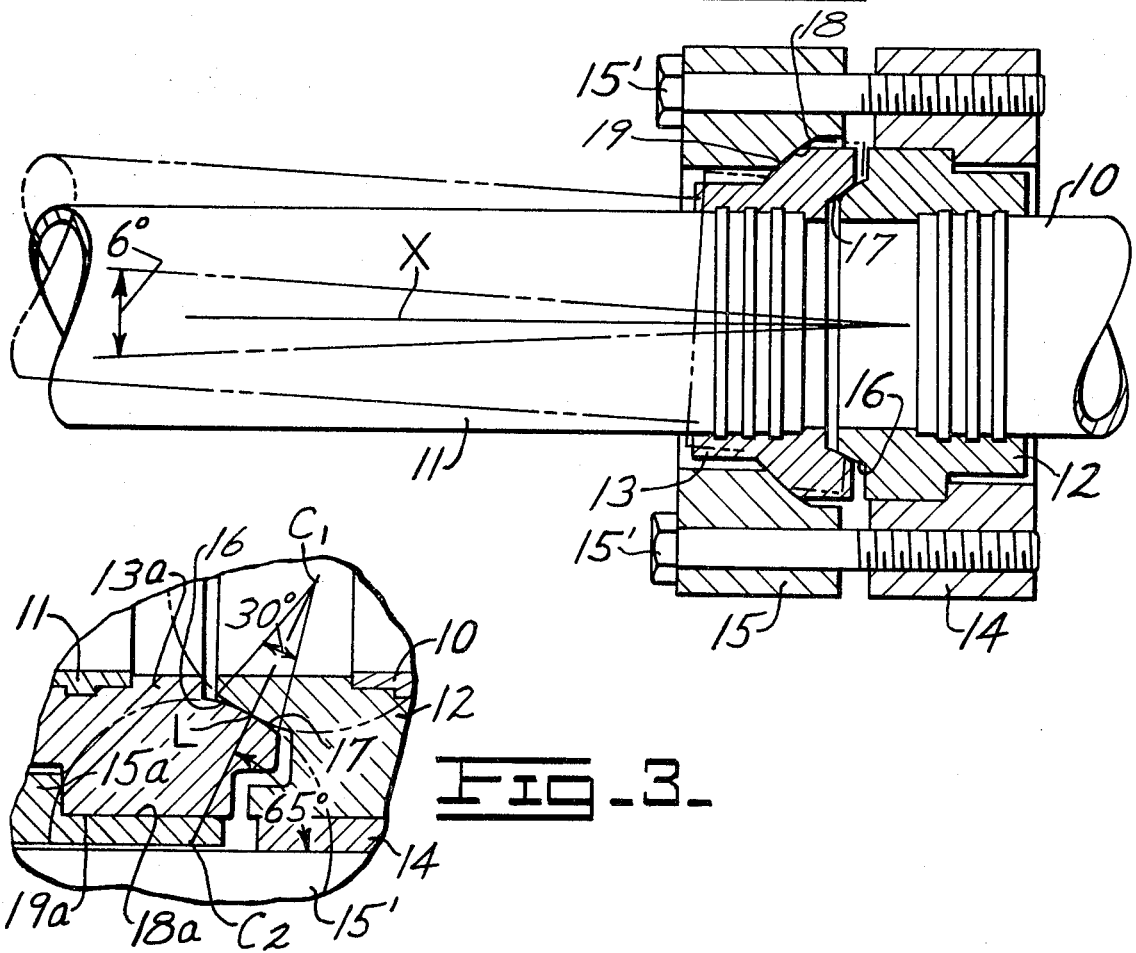

METAL-TO-METAL TUBE SEAL

BACKGROUND OF THE INVENTION

This invention relates to a sealed joint comprising a metal-to-metal seal for connected tubes.

Axially aligned tubes are normally connected together by a flange-type coupling employing one or more elastomeric seals or the like. During assemblage and usage, the tubes may become misaligned to induce fluid leakage at the joint connection.

SUMMARY OF THE INVENTION

An object of this invention is to overcome the above, briefly described leakage problem by providing an economical and efficient sealing arrangement for a joint adapted to attach two axially aligned tubes together. The joint comprises first and second annular members which abut at convex and spherical surface portions formed thereon to provide a substantial line sealing contact even though one of the members is slightly misaligned axially relative to the other member. Attachment means releasably attach the members together to constantly maintain such line sealing contact.

BRIEF DESCRIPTION OF THE DRAWING

FIG. 1 is an end elevational view of a sealed joint employing a preferred metal-to-metal tube seal embodiment of this invention therein;

FIG. 2 is a longitudinal section of the sealed joint, taken in the direction of arrows II—II in FIG. 1; and FIG. 3 is an enlarged sectional view of the metal-to-metal tube seal and further illustrates a slight modification to an attachment means therefor.

DETAILED DESCRIPTION

The illustrated seal joint comprises tubes 10 and 11 normally disposed in axial alignment along a longitudinal axis X. The tubes may be attached to annular first and second members 12 and 13, respectively, by ferrules or the like. Attachment means for releasably attaching the members together may comprise annular flange members 14 and 15 drawn together by circumferentially disposed bolt means 15'.

Members 12 and 13 each have convex and spherical first and second surface portions 16 and 17, respectively, formed circumferentially thereon. Such surface portions abut each other in substantial line contact, as indicated at L in FIG. 3. As illustrated in FIG. 2, the surface portions are constructed and positioned to permit askewed deviation of the longitudinal axis of the first member relative to the longitudinal axis of the second member while permitting the surface portions to remain in substantial line contact. In the preferred embodiment, the maximum askewed deviation between such axes is at least approximately 6°.

As further shown in FIG. 2, concave and spherical surface portions 18 are formed circumferentially and internally on flange member 15. Such surface portions mate with convex and spherical surface portions 19, formed circumferentially and externally on annular member 13, to provide compensating means for permitting askewed deviation of tube 11 relative to tube 10. Such compensating means is in diametrically opposed and axially spaced-apart relationship with respect to surface portions 16 and 17.

FIG. 3 illustrates a slight modification wherein surface portions 18 and 19 are replaced by abutting, cylindrical surface portions 18a and 19a formed on a flange member 15a and an annular member 13a, respectively. Such cylindrical surface portions are disposed in parallel relationship relative to longitudinal axis X to provide locking means on the attachment means for locking the first and second annular members in position with their longitudinal axes in substantial linear alignment.

Referring to FIG. 3, first surface portions 16 are defined by a radius having its center at $C_1$ whereas second surface portions 17 are defined by a radius having its center at $C_2$. In the preferred embodiment, the lengths of such first and second radii are substantially equal. In addition, center $C_1$ is preferably disposed internally of first member 12 whereas second center $C_2$ is disposed externally of second member 13 or 13a and in substantial axially spaced relationship relative to center $C_1$.

Furthermore, it should be noted that an imaginary straight line intersecting such centers and line of contact L, forms an angle with respect to a longitudinal axis of the first member which preferably approximates 65°. A circumferential segment defining each of the first and second surface portions, by the above-mentioned radii, preferably approximates 30°.

A seal of the above type was tested in connection with tubes, each having a 1½ inch O.D. Bolts corresponding to bolts 15' were tightened to 75 ft. lbs. to promote a circumferential line of contact L having a width approximating ⅛ inch. The cycled oil (SAE—30) was maintained at a temperature approximating 150° F.

The joint assembly was run initially for a total of 963,800 cycles at 6,500 psi. After the first 415,200 cycles, the joint was disassembled for inspection and was reassembled with members 12 and 13 turned 180° out of phase from their original position. Upon inspection, the area adjacent line of contact L (FIG. 3) appeared in good condition and no leakage occurred during the above test runs.

Subsequently, the joint assembly was run at 1,407,400 cycles at 5,000 psi. No leakage was noted during such test run and upon inspection the seal again appeared in good condition.

The assembled test seal employed a metallic material for surfaces 17 and 18 which was sufficiently malleable to provide the above-mentioned ⅛ inch width line of contact L. Such width did not distract from the sealing desiderata and, in fact, is believed to have enhanced such sealing by smoothing and covering the irregularities, if any, which were originally present on such surfaces.

What is claimed is:

1. A sealed joint comprising an annular first member, an annular second member positioned closely adjacent to said first member to normally dispose the longitudinal axes thereof in linear alignment, convex and spherical first and second surface portions respectively formed circumferentially and directly on each of said first and second members and circumferentially sealingly abutting each other in direct substantial line contact without interposition of another member, and attachment means for releasably attaching said first and second members together, the lengths of first and second radii, respectively defining such spherical first and second surface portions, being substantially equal.

2. The invention of claim 1 wherein said first and second surface portions are constructed and positioned to permit askew deviation of the longitudinal axis of said first member relative to the longitudinal axis of said second member while permitting said first and second surface portions to remain in substantial line contact.

3. The invention of claim 2 wherein said first and second surface portions are constructed and positioned to permit a maximum askew deviation between said axes of at least approximately 6°.

4. The invention of claim 2 further comprising compensating means formed on said second member and on said attachment means for permitting such askew deviation.

5. The invention of claim 4 wherein said compensating means comprises concave and spherical surface portions formed circumferentially and internally on said attachment means mating with convex and spherical surface portions formed circumferentially and second member in axial spaced apart relationship with respect to said second surface portions.

6. The invention of claim 1 further comprising locking means formed on said second member and on said attachment means for locking said first and second members in position with their longitudinal axes in linear alignment.

7. The invention of claim 6 wherein said locking means comprises abutting, cylindrical surface portions, disposed in parallel relationship relative to the longitudinal axis of said second member, formed internally on said attachment means and externally on said second member.

8. The invention of claim 1 wherein a first center for said first radius is disposed internally of said first member and a second center for said second radius is disposed externally of said second member in substantial axially spaced relationship relative to said first center.

9. The invention of claim 1 wherein an imaginary straight line intersecting the centers of said first and second radii also intersects the line of contact between said first and second surface portions.

10. The invention of claim 1 wherein an imaginary straight line intersecting the centers of said first and second radii forms an angle of approximately 65° with respect to the longitudinal axis of said first member.

11. The invention of claim 1 wherein a circumferential segment defining each of said first and second surface portions by said radii approximates 30°.

12. The invention of claim 1 further comprising a tube attached internally of each of said first and second members and normally disposed in substantial linear alignment and wherein said attachment means comprises an annular flange member mounted on each of said first and second members.

13. The invention of claim 12 wherein said attachment means further comprises circumferentially disposed bolt means securing said flange members together.

14. The invention of claim 1 wherein said line of contact has a width approximating ⅛ inch.

* * * * *